(12) United States Patent
Phan Huy et al.

(10) Patent No.: US 9,031,786 B2
(45) Date of Patent: May 12, 2015

(54) GUIDANCE BY RADIO FOCUSING

(75) Inventors: Dinh Thuy Phan Huy, Paris (FR);
Nadine Malhouroux Gaffet,
Evette-Salbert (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/979,817

(22) PCT Filed: Jan. 12, 2012

(86) PCT No.: PCT/FR2012/050075
§ 371 (c)(1),
(2), (4) Date: Jul. 15, 2013

(87) PCT Pub. No.: WO2012/095609
PCT Pub. Date: Jul. 19, 2012

(65) Prior Publication Data
US 2013/0289877 A1 Oct. 31, 2013

(30) Foreign Application Priority Data

Jan. 14, 2011 (FR) .................................... 11 50328

(51) Int. Cl.
*G01C 21/12* (2006.01)
*G01C 21/00* (2006.01)
G01C 21/20 (2006.01)
*G01S 1/68* (2006.01)

(52) U.S. Cl.
CPC .............. *G01C 21/00* (2013.01); *G01C 21/206* (2013.01); *G01S 1/68* (2013.01)

(58) Field of Classification Search
CPC .................................. G01C 21/26; G01C 21/20

USPC ......................................................... 701/537
See application file for complete search history.

(56) References Cited

U.S. PATENT DOCUMENTS

2002/0119791 A1    8/2002  Bai

OTHER PUBLICATIONS

Walker S et al.: "Synchronized time-reversal focusing with application to remote imaging from a distant virtual source array", The Journal of the Acoustical Society of America, American Institute of Physics for the Acoustical Society of America, New York, NY, US, vol. 125, No. 6, Jun. 1, 2009, pp. 3828-3834, XP012123327.

(Continued)

*Primary Examiner* — James Trammell
*Assistant Examiner* — Michael D Lang
(74) *Attorney, Agent, or Firm* — David D. Bush; Westman, Champlin & Koehler, P.A.

(57) ABSTRACT

A method of guidance by radio focusing includes a "visitor" entity heading towards a radio source of number k=1 (or k=$k_{last}$) by observing intensity of the radio source of number k=1 (or k=$k_{last}$) as measured by an "Evisitor" communicating device carried by the visitor, until the visitor reaches the source of number k=1 (or k=$k_{last}$). The visitor heads in succession for k=1, 2, . . . , $k_{last-1}$ (or in reverse) from a radio source of number k̲ towards a radio source of number (k+1) (or (k−1)) by observing intensity of the source (k+1) (or (k−1)), until the visitor reaches the source (k+1) (or (k−1)). Each radio source is a virtual radio source as produced by a respective signal k̲ or by superposing a plurality of respective signals k̲. Each signal is transmitted by a respective communicating device ER.

5 Claims, 3 Drawing Sheets

(56) References Cited

OTHER PUBLICATIONS

Albert Fannjiang: "Information transfer in disordered media by broadband time-reversal: stability, resolution and capacity; Broadband time reversal communications", Nonlinearity, Institute of Physics Publishing, Bristol, GB, vol. 19, No. 10, Oct. 1, 2006, pp. 2425-2439, XP020100530.

International Search Report dated Jun. 1, 2012 for corresponding International Application No. PCT/FR2012/050075, filed Jan. 12, 2012.

GUIDANCE BY RADIO FOCUSING

CROSS-REFERENCE TO RELATED APPLICATIONS

This application is a Section 371 National Stage Application of International Application No. PCT/FR2012/050075, filed Jan. 12, 2012, which is incorporated by reference in its entirety and published as WO 2012/095609 on Jul. 19, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention relates to the field of navigation, e.g. for pedestrians or cars, under guidance from radio signals.

BACKGROUND OF THE DISCLOSURE

Certain known guidance methods rely on associating two techniques:
creating a geographical map or plan; and
locating the user geographically.
One such method is thus implemented in the satellite guidance system known as the Global Positioning System (GPS).
The drawbacks of the above-mentioned techniques are as follows:
mapping a complex area such as the inside of a building is difficult to perform; and
locating a user in complex surroundings such as a city block or inside a building is complicated to perform, in particular because of multiple reflections and because of shadow effects affecting the electromagnetic waves used for such locating.

On the basis of US patent application 2002/119791, there is also known a method of guiding a user (such as a pedestrian or a motorist) towards a preselected destination. To do this, a management network (known as an "LFN network") uses this preselection (known as a target code) to determine a series of fixed radio transmitters (known as local fixed signal sites or LFS) from a set of such transmitters, in such a manner that the user moves from transmitter to transmitter all the way to the destination. The user goes towards each successive transmitter while consulting a radio receiver (referred to as a tracking unit) that acts in known manner to inform the user about the direction to follow.

Thus, in that known method, each user path is marked by a series of transmitters acting as beacons. Given the above-mentioned complexity of the surroundings in question, those transmitters need to be close to one another so that the distance between the user and each successive transmitter is small; furthermore, it is necessary to provide a sufficient number of transmitters to be able to set up different paths as a function of different destinations. That method thus has the drawback of requiring a very dense set of fixed transmitters to be installed, which transmitters are connected to as a network.

SUMMARY

The present invention thus provides a method of guidance by radio focusing, the method comprising the following steps:

a) an entity referred to as a "visitor" starts from a predetermined location and heads towards a radio source of number k=1 (or respectively k=$k_{last}$) by observing the intensity of said radio source of number k=1 (or respectively k=$k_{last}$) as measured by a communicating device referred to as "Evisitor" carried by said visitor, until the visitor has reached said source of number k=1 (or respectively k=$k_{last}$); and b) said visitor heads in succession for k=1, 2, ..., $k_{last-1}$ (or respectively k=$k_{last}$, $k_{last-1}$, ..., 2) from a radio source of number $\underline{k}$ towards a radio source of number (k+1) (or respectively (k−1)) by observing the intensity of said source of number (k+1) (or respectively (k−1)) as measured by said device Evisitor, until the visitor has reached the source of number (k+1) (or respectively (k−1)).

Said method is remarkable in that each of said radio sources of number $\underline{k}$ for k=1, ..., $k_{last}$ is a virtual radio source referred to as a "spatiotemporal beacon", as produced by a respective signal number $\underline{k}$ or by superposing a plurality of respective signals of number $\underline{k}$, each of these signals being transmitted by a respective communicating device $ER_i$, where i=1, ..., N and N≥1, said communicating devices $ER_i$ being placed at various locations in a predetermined environment, or in the vicinity of said environment.

Thus, according to the invention, for each path in a certain environment along which it is desired to guide a visitor, a series of successive spatiotemporal beacons is put into place to "mark" the path. As mentioned briefly above, those beacons are the result of superposing radio signals that are transmitted by a certain number of communicating devices $ER_i$. It should be observed that in order to do this, the devices $ER_i$ may a priori be positioned anywhere in said environment, and/or in the proximity of said environment; advantageously, the invention makes it possible to install different paths by means of geographically-different series of spatiotemporal beacons, but without needing to move the $ER_i$ devices.

By means of these arrangements, a navigation system is made available that is not very complex and that does not require the guided user to be located, that does not require a map of the zone in which the user is being guided, and that does not require a large number of radio transmitters.

The invention as summarized above has two variants.
In a first variant, the successive movements of the visitor are given successive labels in increasing order of the number $\underline{k}$, from k=1 to k=$k_{last}$. By means of these arrangements, a guide who knows the path can guide a future visitor who does not know the path.

In a second variant, the successive movements of the visitor are labeled successively in decreasing order of the number $\underline{k}$, from k=$k_{last}$ to k=1. By means of these arrangements, the guide and the visitor can be the same person: thus, a visitor who is not familiar with a certain environment can return to a starting point by being guided along a path that the visitor has previously followed in the opposite direction.

According to particular characteristics, each time the visitor reaches a spatiotemporal beacon of number k, where k=1, 2, ..., $k_{last}$ (or respectively k=$k_{last}$, $k_{last-1}$, ..., 1), said device Evisitor informs a central communicating device referred to as "Econtroller", which central device orders said devices $ER_i$ to stop transmitting their respective signals of number $\underline{k}$, and orders the devices $ER_i$ to begin transmitting their respective signals of number (k+1) (or respectively (k−1)), except when k=$k_{last}$ (or respectively k=1).

By means of these arrangements, the visitor who has reached the spatiotemporal beacon of number $\underline{k}$ is then guided to the following spatiotemporal beacon. As a result, the visitor ends up being conveniently guided all along said path.

According to other particular characteristics, at least one of said devices $ER_i$ has previously recorded said respective signal of number $\underline{k}$ during a training stage, during which an entity referred to as a "guide" has passed through said environment along a certain path while provided with a communicating device Eguide transmitting successively, for each value of the number $\underline{k}$ going from k=1 to k=$k_{last}$, a radio signal that is to be recorded, time-reversed, and then transmitted as summarized above by at least one device $ER_i$.

By means of these arrangements, the guide can conveniently record for use by a future visitor a particular path within said environment.

Correspondingly, the invention also provides a system for guidance by radio focusing, the system comprising:
communicating devices $ER_i$, where i=1, . . . , N and N≥1, placed at various locations in a predetermined environment or in the vicinity of said environment, and each having means for transmitting a respective signal; and
at least one communicating device referred to as "Evisitor" suitable for measuring the intensity of a virtual radio source referred to as a "spatiotemporal beacon" produced by said respective signal transmitted by a communicating device $ER_i$ or by superposing a plurality of respective signals transmitted by communicating devices $ER_i$.

According to particular characteristics, said system for guidance by radio focusing further comprises a communicating device referred to as "Econtroller" having means for:
receiving from a communicating device Evisitor, for k=1, 2, . . . , $k_{last}$ (or respectively k=$k_{last}$, $k_{last-1}$, . . . , 1), a message informing it that the intensity of a signal of number $\underline{k}$ measured by said communicating device Evisitor has reached a predetermined level;
for k=1, 2, . . . , $k_{last-1}$ (or respectively k=$k_{last}$, $k_{last-1}$, . . . , 1), ordering said respective communicating devices $ER_i$ to stop transmitting a respective signal of number k; and
for k=1, 2, . . . , $k_{last-1}$ (or respectively k=$k_{last}$, $k_{last-1}$, . . . , 2), ordering said communicating devices $ER_i$ to begin transmitting a respective signal of number (k+1) (or respectively (k−1)).

According to other particular characteristics, said system for guidance by radio focusing further comprises at least one communicating device referred to as "Eguide" having means for transmitting a radio signal, and each of said communicating devices $ER_i$ further includes means for receiving, recording, and time-reversing said radio signal in order to generate the respective signal transmitted as summarized above.

It should be observed that it is possible to implement any of the communicating devices that are summarized above in the context of an electronic circuit.

The advantages provided by these systems are essentially the same as the advantages provided by the corresponding methods summarized above.

The invention also provides a computer program downloadable from a communications network and/or stored on a computer-readable medium and/or executable by a microprocessor. The computer program is remarkable in that it comprises instructions for executing steps of any of the methods of guidance by radio focusing as summarized above when executed on a computer.

The advantages provided by such devices and the computer program are essentially the same as those provided by said method.

BRIEF DESCRIPTION OF THE DRAWINGS

Other aspects and advantages of the invention appear on reading the following detailed description of particular embodiments given as non-limiting examples. The description refers to the accompanying drawings, in which.

DETAILED DESCRIPTION OF ILLUSTRATIVE EMBODIMENTS

Figure 1:
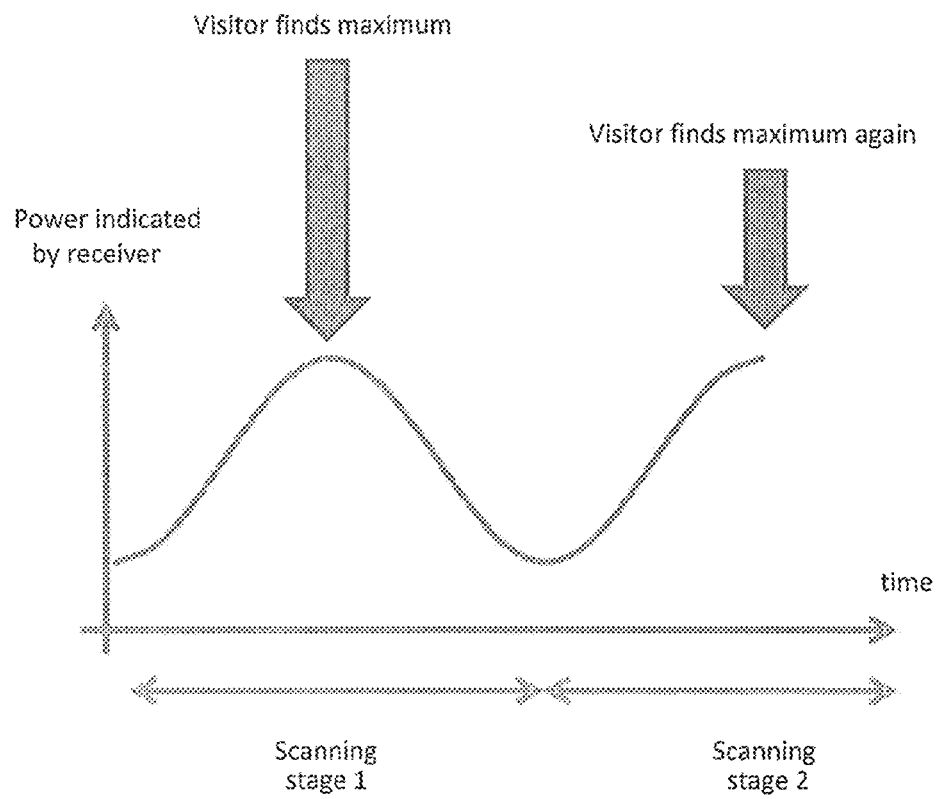
FIG. 1 is a diagram representing the intensity of the signal received by the Evisitor device as a function of time while the visitor performs manual scanning.

There follows a description of a system for guidance by radio focusing in an embodiment of the invention.

The system comprises the following devices:
a communicating device Evisitor that is used by a user of the system said to be a "visitor";
a communicating device Eguide that is used by a user of the system said to be a "guide";
a network of communicating devices $ER_i$, where i=1, . . . , N and N≥1; and
a central device Econtroller suitable for controlling the devices $ER_i$.

As explained above, the guide and the visitor may be distinct people, or they may be the same person.

The communicating device Evisitor has means for:
detecting a radio signal and measuring its intensity; and
when said intensity has reached a predetermined level, sending a corresponding message to said communicating device Econtroller.

The communicating device Econtroller has means for:
receiving from a communicating device Evisitor, for k=1, 2, . . . , $k_{last}$ (or respectively k=$k_{last}$, $k_{last-1}$, . . . , 1), a message informing it that the intensity of a signal of number $\underline{k}$ measured by said communicating device Evisitor has reached a predetermined level;
for k=1, 2, . . . , $k_{last-1}$ (or respectively k=$k_{last}$, $k_{last-1}$, . . . 1), ordering said respective communicating devices $ER_i$ to stop transmitting a respective signal of number $\underline{k}$; and
for k=1, 2, . . . , $k_{last-1}$ (or respectively k=$k_{last}$, $k_{last-1}$, . . . , 2), ordering said communicating devices $ER_i$ to begin transmitting a respective signal of number (k+1) (or respectively (k−1)).

Each communicating device $ER_i$ can record a radio signal transmitted by said communicating device Eguide on condition that it is within radio range of Eguide, and it can associate a number $\underline{k}$ with the received signal, which number is an integer such that 0≤k≤$k_{last}$, where $k_{last}$ is an integer parameter of value that is determined empirically as described below. In addition, each communicating device $ER_i$ includes means for transmitting a respective signal of number $\underline{k}$ obtained by time reversal of said received signal of number $\underline{k}$.

A starting point is selected for the path to be followed by a future visitor; by way of example, it may be a position in three dimensions indicated by a panel or by a mark on the ground or by a sound, that can be detected by the visitor.

The invention has two successive stages, namely a training stage and a guiding stage.

The training stage comprises the following steps.

During a step A0, the guide positions Eguide at the above-mentioned starting point.

During a step A1, the guide switches ON Eguide.

During a step A2, Eguide synchronizes itself with Econtroller. From this moment, Eguide possesses the same time reference as Econtroller and all of the devices $ER_i$ of the network.

During a step A3, and starting from an instant t0, Econtroller initializes the network by:

allocating the value zero to the number $\underline{k}$; and deleting all of the recordings, if any, in the devices $ER_i$.

During a step A4, Econtroller sends a starting signal to Eguide, which signal is received at an instant $t_0+dt1$.

During a step A5, Eguide sends a starting signal to the guide at an instant $t_0+dt1+dt2$. The guide then starts to move.

During a step A6:

at each instant $(t_0+k_0 \cdot T+k \cdot T)$, where $k_0$ is a predetermined constant such that $k_0 \cdot T > (dt1+dt2)$, and $T$ is a predetermined duration, Eguide transmits a predetermined signal of duration $d < T$; and in each time interval $[t_0+k_0 \cdot T+k \cdot T, t_0+k_0 \cdot T+(k+1) \cdot T]$, each $ER_i$ attempts to detect the signal transmitted by Eguide; on detecting a signal, each $ER_i$ records the respective signal it has received and allocates the number $\underline{k}$ thereto.

This step A6 thus continues over time until during a step A7 the guide stops moving and switches OFF Eguide.

Finally, during a step E8, Econtroller allocates the current value of $\underline{k}$ to the parameter $k_{last}$.

During the guidance stage, when the guide and the visitor are distinct people, the stage comprises the following steps.

During a step B0, the visitor positions Evisitor at the starting point defined in the preceding stage, which starting point has previously been communicated to the visitor by the guide.

During a step B1, the visitor switches ON Evisitor.

During a step B2, Evisitor synchronizes itself with Econtroller. From this moment, Evisitor has the same time reference as Econtroller and as all of the devices $ER_i$.

Econtroller then configures a parameter $k_{control}$ in the devices $ER_i$, and it gives the initial value 1 to that parameter.

During a step B3a, Econtroller orders each device $ER_i$ to see whether it possesses a recording associated with a number equal to the current value of $k_{control}$. Each device $ER_i$ that possesses such a recording transmits it, in repeated manner, if necessary, after time-reversing it, thereby creating a virtual source by focusing, which virtual source constitutes a spatiotemporal beacon.

The spatiotemporal focusing method used herein is based on the study set out in the article by C. Oestges, J. Hansen, S. M. Emami, A. D. Kim, G. Papanicolaou, and A. J. Paulraj entitled "Time-reversal techniques for broadband wireless communication systems", 2004, and accessible on the Internet at: http://wwwold.ftw.at/ftw/events/telekommunikationsforum/SS2005/SS05docs/050415paper.pdf. It is recalled that time-reversal is a technique (that was originally used in the field of soundwaves) that relies on the invariance of the wave equation under time-reversal; thus, a time-reversed wave propagates like a forward wave going backwards in time. When a wave transmitted from an origin point propagates through a propagation medium, and when a portion of that wave is received by a destination point (specifically a device $ER_i$) and is time-reversed before being retransmitted into the propagation medium, the wave converges on the origin point where it forms a focal spot: the signal reaching the origin point is almost identical in waveform to the original signal transmitted from the origin point.

This transmission continues until each Econtroller has received a message from Evisitor indicating that the visitor has reached spatiotemporal beacon number $k_{control}$.

When Econtroller receives a message from Evisitor indicating that the visitor has reached the spatiotemporal beacon (cf. step B3b below), it increments $k_{control}$ and repeats step B3a.

Throughout the time step B3a is being performed, Evisitor performs a step B3b.

Evisitor attempts to detect a radio signal continuously. If a signal is detected, the visitor determines the direction from which the signal is coming by using a simple procedure for detecting the intensity maximum of the signal (various implementations of that procedure are described below).

The visitor then moves in the direction found and the intensity of the signal received by Evisitor increases correspondingly.

When the intensity of the received signal has reached a predetermined level, it is assumed that the visitor has reached the spatiotemporal beacon and Evisitor sends a corresponding message to Econtroller.

These steps B3a and B3b are repeated until Econtroller that $k_{control} = k_{last}$.

During a step B4, Econtroller informs Evisitor that the destination has been reached.

During a step B5, Evisitor informs the visitor that the destination has been reached.

Finally, during a step B6, the visitor switches OFF Evisitor.

When the guide and the visitor are the same person, the guiding stage comprises the same steps as above, except that decreasing values of the number $\underline{k}$ are used in succession going from $k=k_{last}$ to $k=1$, instead of increasing values.

Above step B3b relies on the fact a radio signal is created that comes from a spatiotemporal beacon, so that the intensity of that signal is at a maximum in the direction of that spatiotemporal beacon. It should be observed that in order for a spatiotemporal beacon to be properly detected, it is preferable for Evisitor to be situated constantly in a focal spot corresponding to the current beacon; as a result, each pair of successive beacons must be such that the beacons are close enough to one another; more precisely, the distance between two successive beacons should preferably be of the same order of magnitude as the wavelength of the radio signals. The optimum value for the duration T between the recordings of two successive beacons is derived therefrom, given the travel speed of the guide.

There follows a description of various implementations of step B3b, in which a detection method is described that the visitor can use for determining the direction in which the spatiotemporal beacon is to be found.

In a first implementation of the detection method, the visitor performs manual scanning, comprising both a "go" stage 1 and a "return" stage 2.

Evisitor displays the intensity of the signal received from the virtual source. The visitor then looks for the direction in which the intensity is at a maximum, as shown in FIG. 1: that is the direction to the source.

For visitor comfort, provision may be made for Evisitor to be capable of automatically determining from the various measurements if a maximum is reached and of informing the visitor by means of an indicator light.

Figure 2:
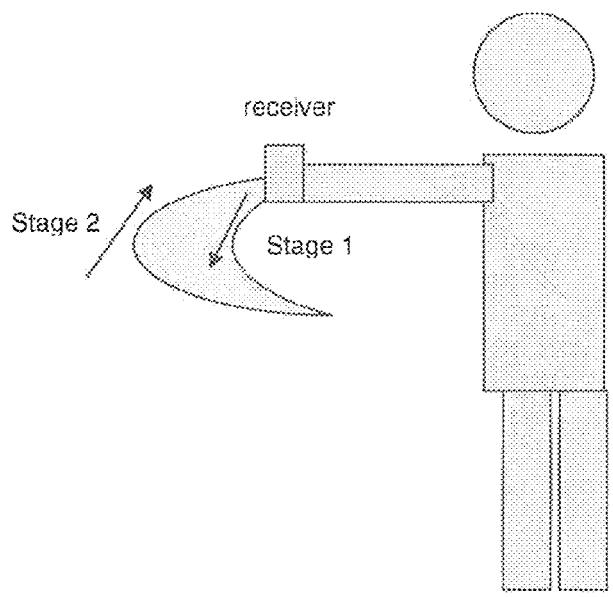
FIG. 2 shows the manual scanning movement performed by the visitor, when the Evisitor device has a non-directional antenna.

In a first variant, shown in FIG. 2, Evisitor is a receiver that has a non-directional antenna.

It should be observed that this variant requires strong focusing.

Figure 3:
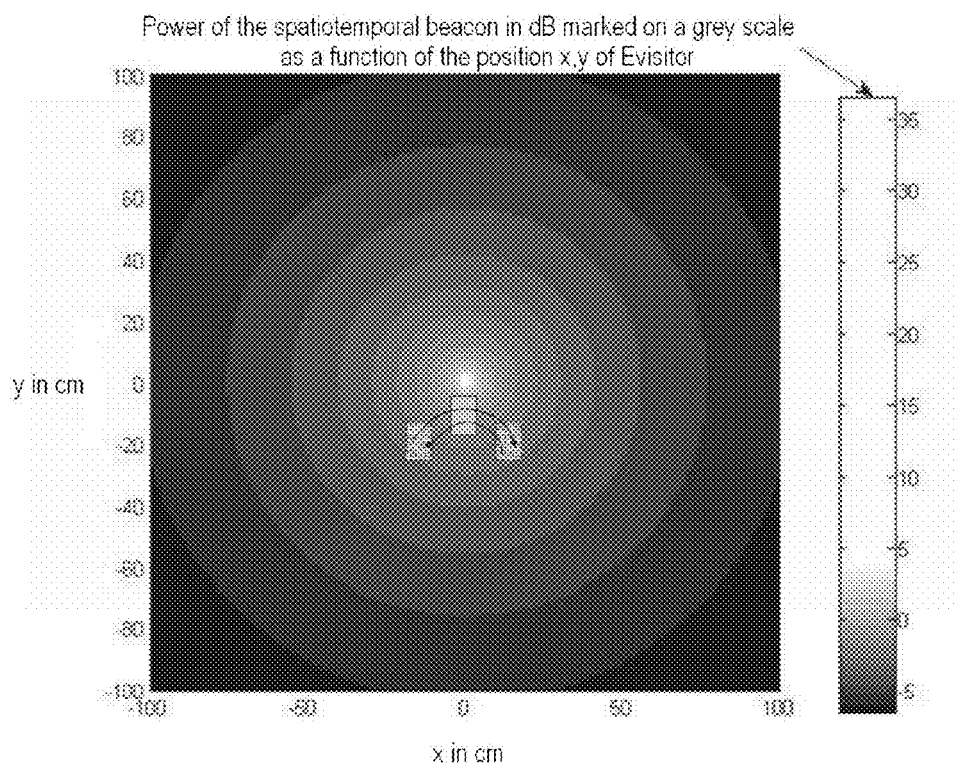
FIG. 3 is an example of a graph showing the intensity of the signal received by the Evisitor device as a function of its position, in the situation shown in FIG. 2.

FIG. 3 is an example of a graph showing the intensity of the signal received in this variant by Evisitor as a function of its position.

Figure 4:
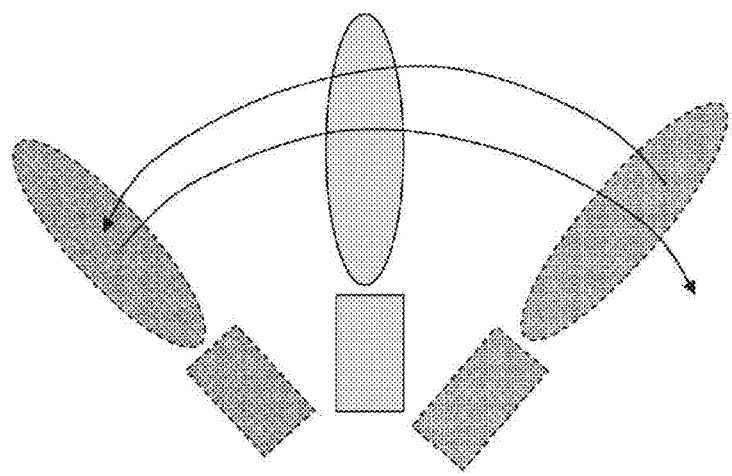
FIG. 4 shows the manual scanning movement performed by the visitor when the Evisitor device has a directional antenna.

In a second variant of the first implementation, as shown in FIG. 4, Evisitor has a directional antenna.

In this situation, the detection method comprises the same steps as in the first variant, with one exception: Evisitor receives in one direction only, so the visitor must point Evisitor in order to find the direction towards the source.

It should be observed that this second variant requires focusing that need not be as strong as in the first variant.

Figure 5:
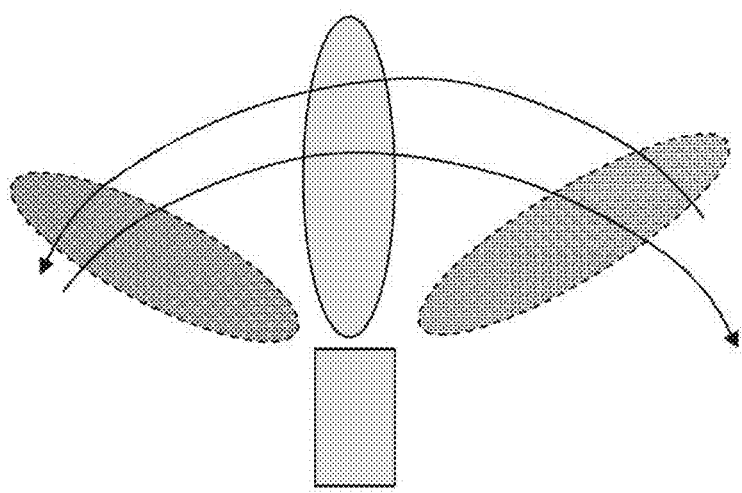
FIG. 5 shows automatic scanning when the Evisitor device has a plurality of sensors.

In a second implementation of the detection method, as shown in FIG. 5, the visitor benefits from automatic scanning, and Evisitor has a plurality of sensors.

Under such circumstances, Evisitor can perform simultaneous measurements and Evisitor applies reception coefficients in baseband on its sensors in order to form a plurality of beams. Evisitor then determines which beam is receiving the strongest intensity, without there being any need for the visitor to perform a scanning movement. Thereafter, Evisitor informs the visitor of the direction of this maximum intensity beam.

As mentioned above, the present invention also provides a computer system implementing the above-described method of guidance by radio focusing. The computer system comprises in conventional manner a central processor unit using signals to control a memory, an input unit, and an output unit.

Furthermore, the computer system may be used to execute a computer program having instructions for performing the method of the invention for guidance by radio focusing.

The invention also provides a computer program that is downloadable from a communications network and that comprises instructions for executing steps of a method of the invention for guidance by radio focusing when it is executed on a computer. The computer program may be stored on a computer-readable medium and may be executed by a microprocessor.

The program may use any programming language and may be in the form of source code, object code, or of code intermediate between source code and object code, in a partially compiled form, or in any other desirable form.

The invention also provides a computer-readable data medium including instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means such as a hard disk, or else a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from a network of the Internet type.

In a variant, the data medium may be an integrated circuit in which the computer program is incorporated, the circuit being adapted to execute or to be used in the execution of the method of the invention.

Finally, it should be observed that there is no limitation concerning the radio transmission techniques that are suitable for performing the invention. By way of example, the radio networks concerned may be:

mobile networks (3GPP UMTS, HSPA, LTE, LTE-A, IEEE 802.16, Mobile XiMAX, 1xEVDV, etc.); or fixed networks (WLAN, IEEE 802.11, etc.).

The invention claimed is:

1. A method of guidance by radio focusing, the method comprising the following steps:
   a) an entity referred to as a "visitor" starts from a predetermined location and heads towards a radio source of number k=1 (or respectively k=$k_{last}$) by observing an intensity of said radio source of number k=1 (or respectively k=$k_{last}$) as measured by a communicating device referred to as "Evisitor" carried by said visitor, until the visitor has reached said source of number k=1 (or respectively k=$k_{last}$); and
   b) said visitor heads in succession for k=1, 2, . . . , $k_{last-1}$ (or respectively k=$k_{last}$, $k_{last-1}$, . . . , 2) from a radio source of number $\underline{k}$ towards a radio source of number (k+1) (or respectively (k−1)) by observing the intensity of said source of number (k+1) (or respectively (k−1)) as measured by said device Evisitor, until the visitor has reached the source of number (k+1) (or respectively (k−1));
   wherein each of said radio sources of number $\underline{k}$ for k=1, . . . , $k_{last}$ is a virtual radio source referred to as a "spatiotemporal beacon", as produced by a respective signal of number $\underline{k}$ or by superposing a plurality of respective signals of number $\underline{k}$, each of these signals being transmitted by a respective communicating device $ER_i$, where i=1, . . . , N and N≥1, said communicating devices $ER_i$ being placed at various locations in a predetermined environment, or in the vicinity of said environment,
   and wherein said respective signal of number $\underline{k}$ results from the time-reversal of a signal which was previously recorded by at least one of said devices ERi during a training stage, during which an entity referred to as a "guide" has passed through said environment along a certain path while provided with a communicating device Eguide transmitting successively, for each value of the number $\underline{k}$ going from k=1 to k=klast, a respective signal of number $\underline{k}$.

2. The method according to claim 1, wherein each time the visitor reaches a spatiotemporal beacon of number $\underline{k}$, where k=1, 2, . . . , $k_{last}$ (or respectively k=$k_{last}$, $k_{last-1}$, . . . , 1), said device Evisitor informs a central communicating device referred to as "Econtroller", which central device orders said devices $ER_i$ to stop transmitting their respective signals of number $\underline{k}$, and orders the devices $ER_i$ to begin transmitting their respective signals of number (k+1) (or respectively (k−1)), except when k=$k_{last}$ (or respectively k=1).

3. A system for guidance by radio focusing, the system comprising:
   communicating devices $ER_i$, where i=1, . . . , N and N≥1, placed at various locations in a predetermined environment or in the vicinity of said environment, and each having a transmitter for transmitting a respective signal;
   at least one communicating device referred to as "Evisitor" configured to measure an intensity of a virtual radio source referred to as a "spatiotemporal beacon" produced by said respective signal transmitted by a communicating device $ER_i$ or by superposing a plurality of respective signals transmitted by communicating devices $ER_i$; and
   at least one communicating device referred to as "Eguide" being configured to transmit a radio signal,
   wherein each of said communicating devices ERi is further configured to receive, record, and time-reverse said radio signal transmitted by the communicating device "Eguide", in order to generate the respective signal transmitted by the communicating device ERi.

4. The system for guidance by radio focusing according to claim 3, further comprising a communicating device referred to as "Econtroller" configured to:

receive from a communicating device Evisitor, for k=1, 2, ..., $k_{last}$ (or respectively k=$k_{last}$, $k_{last-1}$, ..., 1), a message informing the Econtroller that the intensity of a signal of number $\underline{k}$ measured by said communicating device Evisitor has reached a predetermined level;

for k=1, 2, ..., $k_{last-1}$ (or respectively k=$k_{last}$, $k_{last-1}$, ..., 1), order said respective communicating devices $ER_i$ to stop transmitting a respective signal of number $\underline{k}$; and for k=1, 2, ..., $k_{last-1}$ (or respectively k=$k_{last}$, $k_{last-1}$, ..., 2), order said communicating devices $ER_i$ to begin transmitting a respective signal of number (k+1) (or respectively (k−1)).

5. A non-transmissible computer-readable medium comprising computer program code instructions stored thereon for executing steps of a method for guidance by radio focusing, the method comprising:

a) an entity referred to as a "visitor" starts from a predetermined location and heads towards a radio source of number k=1 (or respectively k=$k_{last}$) by observing an intensity of said radio source of number k=1 (or respectively k=$k_{last}$) as measured by a communicating device referred to as "Evisitor" carried by said visitor, until the visitor has reached said source of number k=1 (or respectively k=$k_{last}$); and b) said visitor heads in succession for k=1, 2, ..., $k_{last-1}$ (or respectively k=$k_{last}$, $k_{last-1}$, ..., 2) from a radio source of number $\underline{k}$ towards a radio source of number (k+1) (or respectively (k−1)) by observing the intensity of said source of number (k+1) (or respectively (k−1)) as measured by said device Evisitor, until the visitor has reached the source of number (k+1) (or respectively (k−1));

wherein each of said radio sources of number $\underline{k}$ for k= 1, ..., $k_{last}$ is a virtual radio source referred to as a "spatiotemporal beacon", as produced by a respective signal of number $\underline{k}$ or by superposing a plurality of respective signals of number $\underline{k}$, each of these signals being transmitted by a respective communicating device $ER_i$, where i=1, ..., N and N≥1, said communicating devices $ER_i$ being placed at various locations in a predetermined environment, or in the vicinity of said environment, and wherein said respective signal of number $\underline{k}$ results from the time-reversal of a signal which was previously recorded by at least one of said devices ERi during a training stage, during which an entity referred to as a "guide" has passed through said environment along a certain path while provided with a communicating device Eguide transmitting successively, for each value of the number $\underline{k}$ going from k=1 to k=klast, a respective signal of number $\underline{k}$.

* * * * *